US010115491B2

(12) United States Patent
Diamond et al.

(10) Patent No.: US 10,115,491 B2

(45) **Date of Patent: *Oct. 30, 2018**

(54) PRODUCTION OF MOLYBDENUM-99 USING ELECTRON BEAMS

(71) Applicant: Canadian Light Source Inc., Saskatoon (CA)

(72) Inventors: William Diamond, Deep River (CA); Vinay Nagarkal, Saskatoon (CA); Mark de Jong, Saskatoon (CA); Christopher Regier, Saskatoon (CA); Linda Lin, Saskatoon (CA); Douglas Ullrich, Saskatoon (CA)

(73) Assignee: Canadian Light Source Inc., Saskatoon (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,683

(22) Filed: Dec. 19, 2017

(65) Prior Publication Data

US 2018/0102196 A1 Apr. 12, 2018

Related U.S. Application Data

(63) Continuation of application No. 13/901,213, filed on May 23, 2013, now Pat. No. 9,892,808.

(51) Int. Cl.

*G01N 23/00* (2006.01)

*G21K 5/08* (2006.01)

(52) U.S. Cl.

CPC .................................... *G21K 5/08* (2013.01)

(58) Field of Classification Search

CPC ............ G01G 21/12; G01N 2223/076; G01N 23/223; G01N 223/0766;

(Continued)

(56) References Cited

U.S. PATENT DOCUMENTS

| | | | |
|---|---|---|---|
| 5,784,423 | A | 7/1998 | Lidsky et al. |
| 2010/0028234 | A1 | 2/2010 | Ehst et al. |
| 2012/0281799 | A1 | 11/2012 | Wells et al. |

FOREIGN PATENT DOCUMENTS

| | | | |
|---|---|---|---|
| CN | 1166228 | A | 11/1997 |
| JP | 2011153827 | A | 8/2011 |

(Continued)

OTHER PUBLICATIONS

Search Report dated Sep. 12, 2017 received in related Russian Application 2015155247/07.

(Continued)

*Primary Examiner* — Dani Fox

(74) *Attorney, Agent, or Firm* — McCarthy Tetrault LLP

(57) ABSTRACT

An apparatus for producing $^{99}$Mo from a plurality of $^{100}$Mo targets through a photo-nuclear reaction on the $^{100}$Mo targets. The apparatus comprises: (i) an electron linear accelerator component; (ii) a converter component capable of receiving the electron beam and producing therefrom a shower of bremsstrahlung photons; (iii) a target irradiation component for receiving the shower of bremsstrahlung photons for irradiation of a target holder mounted and positioned therein. The target holder houses a plurality of $^{100}$Mo target discs. The apparatus additionally comprises (iv) a target holder transfer and recovery component for receiving, manipulating and conveying the target holder by remote control; (v) a first cooling system sealingly engaged with the converter component for circulation of a coolant fluid therethrough; and (vi) a second cooling system sealingly engaged with the target irradiation component for circulation of a coolant fluid therethrough.

11 Claims, 18 Drawing Sheets

(58) Field of Classification Search
CPC ....... G01N 2223/6126; G01N 23/4833; G01N 33/487; G01N 2223/074; G01N 2223/309; G01N 2223/64; G01N 23/2202; G01N 23/2204; G01N 2333/91215; G01N 2333/96441; G01N 2500/04; G01N 33/566; G01N 33/6842; A61B 6/485
See application file for complete search history.

(56) References Cited

FOREIGN PATENT DOCUMENTS

| | | | |
|---|---|---|---|
| RU | 2001100541 | A | 3/2003 |
| RU | 2012112084 | A | 8/2013 |
| WO | 97/09724 | A1 | 3/1997 |
| WO | 20140186898 | A1 | 11/2014 |

OTHER PUBLICATIONS

International Preliminary Report on Patentability (Chapter 2 of the PCT), received in related International Patent Application No. PCT/CA2014/050479, dated Aug. 4, 2015.

Office Action dated Dec. 21, 2016, and English translation thereof, received in related Chinese Application No. 201480041163.2.

Extended European Search report dated Jan. 3, 2017, received in related European Application No. 14801507.6.

Notification Concerning Transmittal of International Preliminary Report on Patentability (Chapter 1 of the PCT) received in related International Patent Application No. PCT/CA2015/050473, dated Dec. 8, 2016.

PRODUCTION OF MOLYBDENUM-99 USING ELECTRON BEAMS

CROSS REFERENCE TO RELATED APPLICATIONS

This application is a continuation of U.S. application Ser. No. 13/901,213, filed on May 23, 2013, which is hereby incorporated in its entirety by reference.

TECHNICAL FIELD

The present disclosure pertains to processes, systems, and apparatus, for production of molybdenum-99. More particularly, the present disclosure pertains to production of molybdenum-99 from molybdenum-100 targets using high-power electron linear accelerators.

BACKGROUND

Technetium-99m, referred to hereinafter as $^{99m}$Tc, is one of the most widely used radioactive tracers in nuclear medicine diagnostic procedures. $^{99m}$Tc is used routinely for detection of various forms of cancer, for cardiac stress tests, for assessing the densities of bones, for imaging selected organs, and other diagnostic testing. $^{99m}$Tc emits readily detectable 140 keV gamma rays and has a half-life of only about six hours, thereby limiting patients' exposure to radioactivity. Because of its very short half-life, medical centres equipped with nuclear medical facilities derive $^{99m}$Tc from the decay of its parent isotope molybdenum-99, referred to hereinafter as $^{99}$Mo, using $^{99m}$Tc generators. $^{99}$Mo has a relatively long half life of 66 hours which enables its world-wide transport to medical centres from nuclear reactor facilities wherein large-scale production of $^{99}$Mo is derived from the fission of highly enriched $^{235}$Uranium. The problem with nuclear production of $^{99}$Mo is that its world-wide supply originates from five nuclear reactors that were built in the 1960s, and which are close to the end of their lifetimes. Almost two-thirds of the world's supply of $^{99}$Mo currently comes from two reactors: (i) the National Research Universal Reactor at the Chalk River Laboratories in Ontario, Canada, and (ii) the Petten nuclear reactor in the Netherlands. In the past few years, there have been major shortages of $^{99}$Mo as a consequence of planned or unplanned shutdowns at both of the major production reactors. Consequently, serious shortages occurred at the medical facilities within several weeks of the reactor shutdowns, causing significant reductions in the provision of medical diagnostic testing and also, placing great production demands on the remaining nuclear reactors. Although both facilities are now active again, there is much global uncertainty regarding a reliable long-term supply of $^{99}$Mo.

SUMMARY

The exemplary embodiments of the present disclosure pertain to apparatus, systems, and processes for the production of molybdenum-99 ($^{99}$Mo) from molybdenum-100 ($^{100}$Mo) by high-energy electron irradiation with linear accelerators. Some exemplary embodiments relate to systems for working the processes of present disclosure. Some exemplary embodiments relate to apparatus comprising the systems of the present disclosure.

DESCRIPTION OF THE DRAWINGS

The present disclosure will be described in conjunction with reference to the following drawings in which.

DETAILED DESCRIPTION

Figure 1:
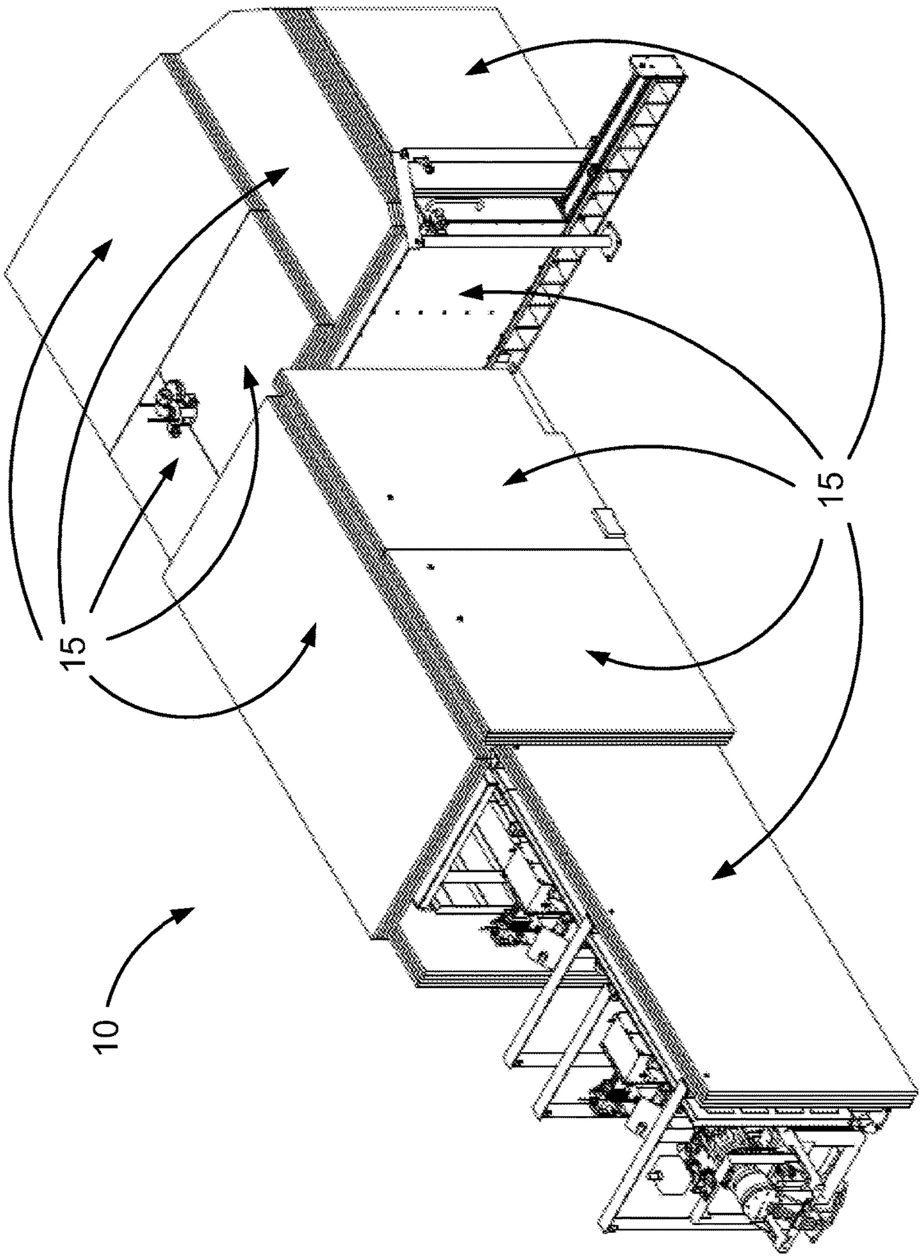
FIG. 1 is a perspective illustration of an exemplary system of the present disclosure, shown with protective shielding in place.
Figure 2:
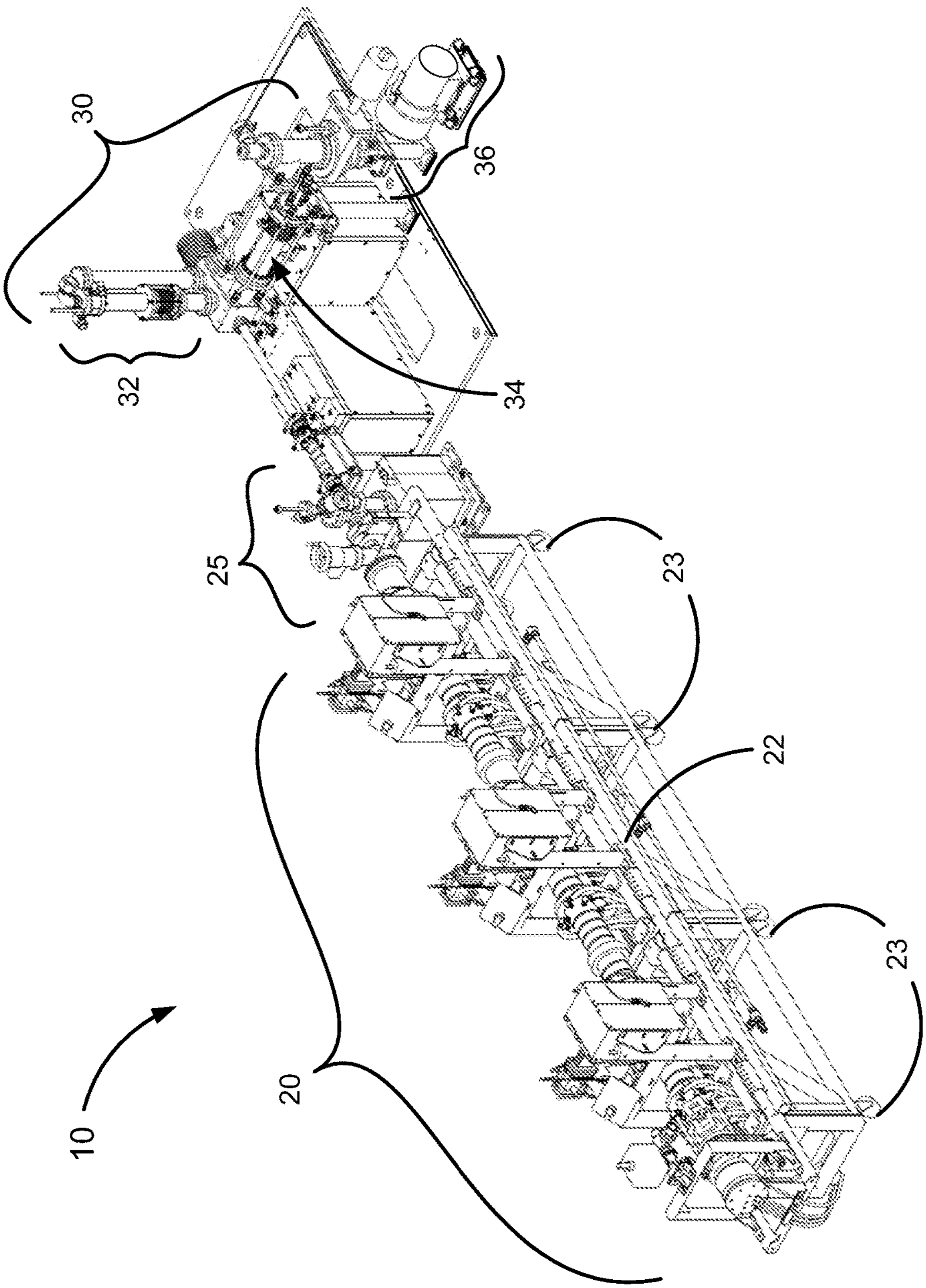
FIG. 2 is a perspective view of the exemplary system from FIG. 1, shown with the protective shielding removed.
Figure 3:
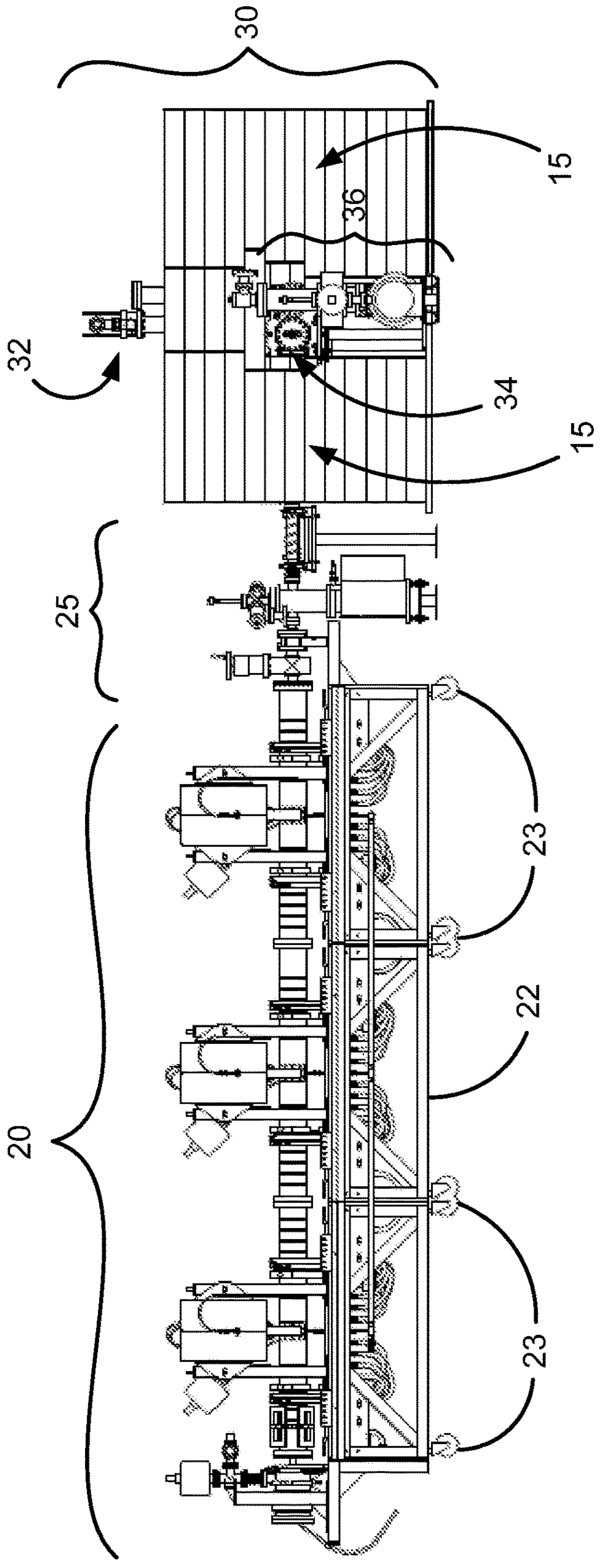
FIG. 3 is a side view of the exemplary system from FIG. 2, shown with protective shielding removed from the linear accelerator components of the system.
Figure 4:
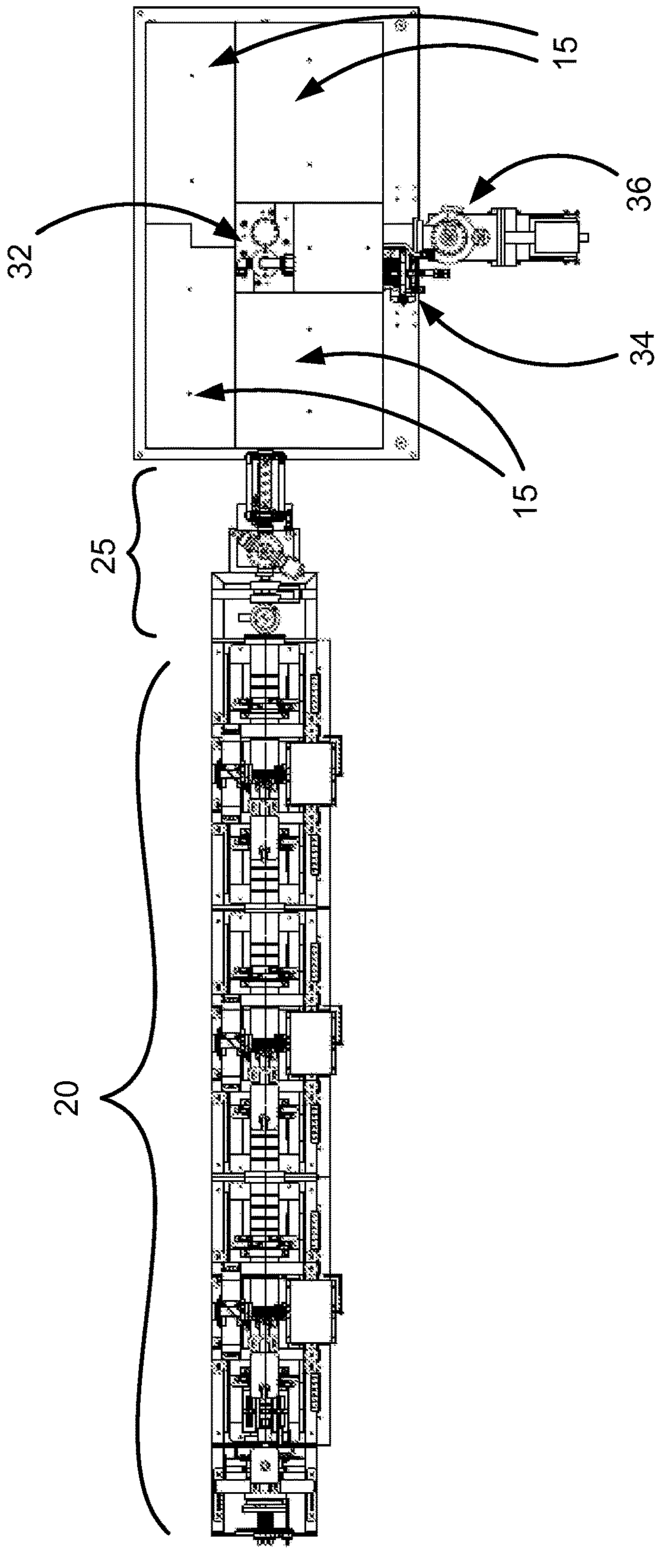
FIG. 4 is a top view of the exemplary system shown in FIG. 3.
Figure 5:
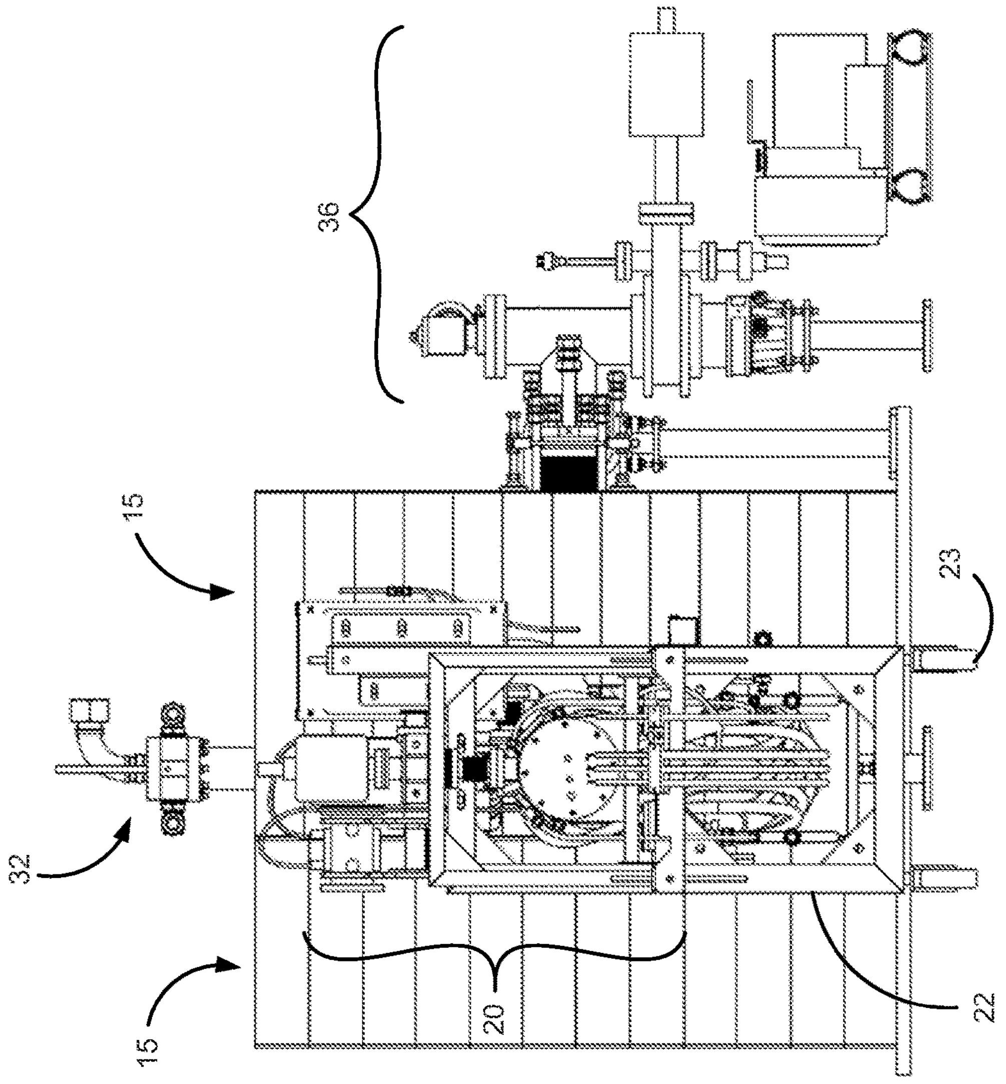
FIG. 5 is an end view of the from FIG. 3, shown from the end with the linear accelerator components.
Figure 6:
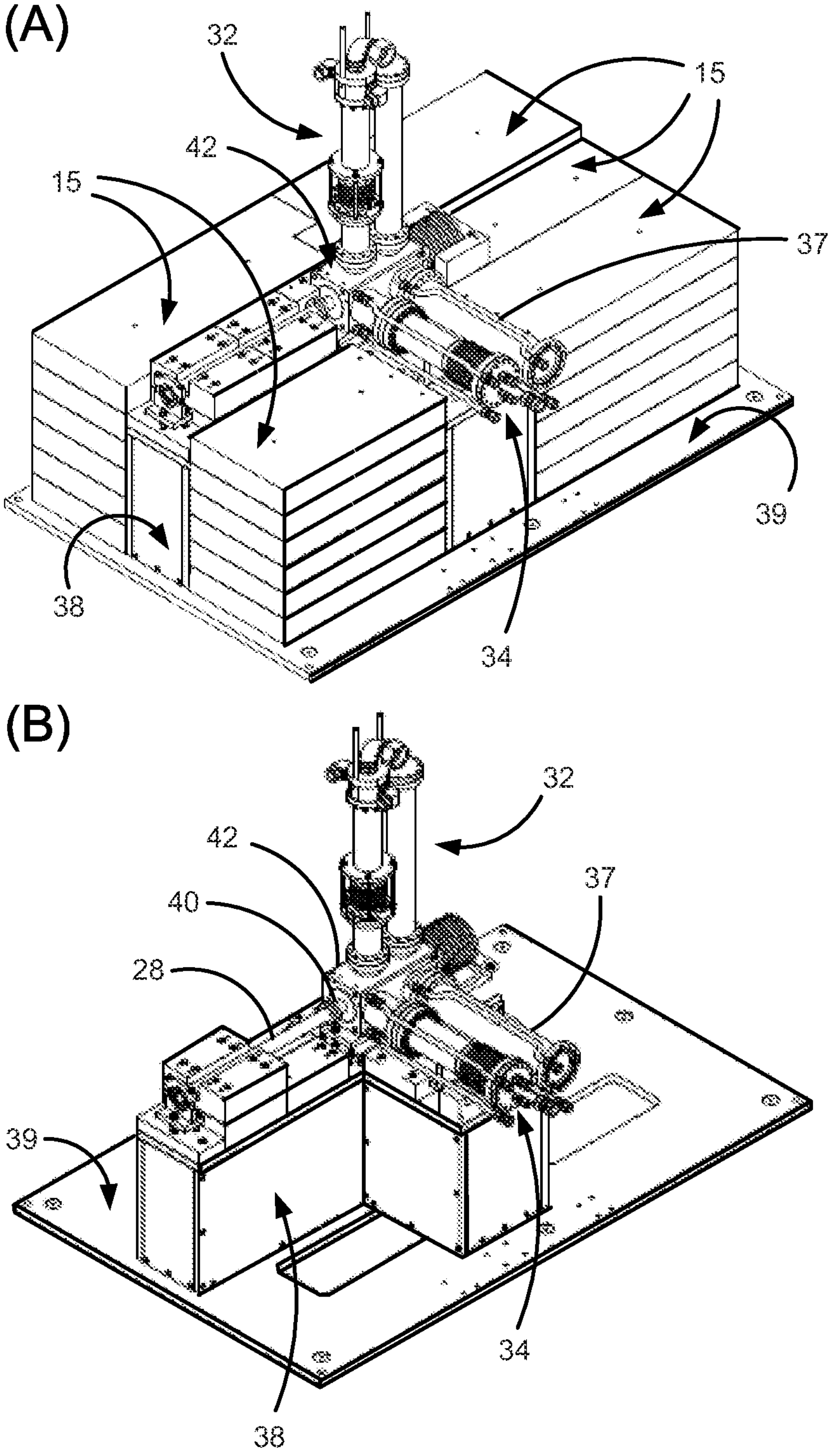
FIG. 6(A) is a perspective view showing the target assembly component of the exemplary system from FIG. 2 partially unclad with the protective shielding component, while 6(B) is a perspective view showing the target assembly component unclad.

The exemplary embodiments of the present disclosure pertain to systems, apparatus, and processes for producing $^{99}$Mo from $^{100}$Mo targets using high-energy radiation from electron beams generated by linear particle accelerators.

A linear particle accelerator (often referred to as a "linac") is a particle accelerator that greatly increases the velocity of charged subatomic particles by subjecting the charged particles to a series of oscillating electric potentials along a linear beamline. Generation of electron beams with a linac generally requires the following elements: (i) a source for generating electrons, typically a cathode device, (ii) a high-voltage source for initial injection of the electrons into (iii)

a hollow pipe vacuum chamber whose length will be dependent on the energy desired for the electron beam, (iv) a plurality of electrically isolated cylindrical electrodes placed along the length of the pipe, (v) a source of radio frequency energy for energizing each of cylindrical electrodes, i.e., one energy source per electrode, (vi) a plurality of quadrupole magnets surrounding the pipe vacuum chamber to focus the electron beam, (vii) an appropriate target, and (viii) a cooling system for cooling the target during radiation with the electron beam. Linacs have been used routinely for various uses such as the generation of X-rays, and for generation of high energy electron beams for providing radiation therapies to cancer patients.

Linacs are also commonly used as injectors for higher-energy accelerators such as synchrotrons, and may also be used directly to achieve the highest kinetic energy possible for light particles for use in particle physics through bremsstrahlung radiation. Bremsstrahlung radiation is the electromagnetic radiation produced by the deceleration of a charged particle when deflected by another charged particle, typically of an electron by an atomic nucleus. The moving electron loses kinetic energy, which is converted into a photon because energy is conserved. Bremsstrahlung radiation has a continuous spectrum which becomes more intense and whose peak intensity shifts toward higher frequencies as the change of the energy of the accelerated electrons increases.

However, to those skilled in these arts, it would seem that using electron linacs to produce high-energy photons through bremsstrahlung radiation to then produce radioisotopes through a photo-nuclear reaction would be an inefficient process for production of radio isotopes because the electromagnetic interactions of electrons with nuclei are usually significantly smaller than the strong interactions with protons as the incident particles. We have determined however, that $^{100}$Mo has a broad "giant dipole resonance" (GDR) for photo-neutron reactions around 15 MeV photon energy which results in a significant enhancement of the reaction cross-section between $^{100}$Mo and $^{99}$Mo. Also, the radiation length of a high-energy photon in the 10 to 30 MeV range in $^{100}$Mo is about 10 mm which is significantly longer than the range of a proton of the same energy. Consequently, the effective target thickness is also much larger for photo-neutron reactions compared to proton reactions. The reduced number of reaction channels associated with linac-generated electron beams limits the production of undesirable isotopes. In comparison, using proton beams to directly produce $^{99}$Tc from $^{100}$Mo often results in the generation of other Tc isotopes from other stable Mo isotopes that may be present in the enriched $^{100}$Mo targets. Medical applications place strict limits on the amounts of other radio-isotopes that may be present with $^{99}$Tc, and it would seem that production of $^{99}$Tc from $^{100}$Mo with linac-generated electron would be preferable because the risk of producing other Tc isotopes is significantly lower. Furthermore, it appears that photo-neutron reactions with other Mo isotopes present in $^{100}$Mo targets usually results in stable Mo.

Accordingly, one embodiment of the present disclosure pertains to an exemplary high-power linac electron beam apparatus for producing $^{99}$Mo from a plurality of $^{100}$Mo targets through a photo-nuclear reaction on the $^{100}$Mo targets. The apparatus generally comprises at least (i) an electron linear accelerator capable of producing electrons beams having at least 5 kW of power, about 10 kW of power, about 15 kW of power, about 20 kW of power, about 25 kW of power, about 30 kW of power, about 35 kW of power, about 45 kW of power, about 60 kW of power, about 75 kW of power, about 100 kW of power, (ii) a water-cooled converter to produce a high flux of high-energy bremsstrahlung photons of at least 20 MeV from the electron beam generated by the linear accelerator, a flux of about 25 MeV of bremsstrahlung photons, a flux of about 30 MeV of bremsstrahlung photons, a flux of about 35 MeV of bremsstrahlung photons, a flux of about 40 MeV of bremsstrahlung photons, a flux of about 45 MeV of bremsstrahlung photons, (iii) of a water-cooled target assembly component for mounting therein a target holder housing a plurality of $^{100}$Mo targets and for precisely positioning and aligning the target holder for interception of beam of high-energy bremsstrahlung photon radiation produced by the water-cooled converter, and (iv) a plurality of shielding components for cladding the water-cooled target assembly component to contain gamma radiation and/or neutron radiation within the target assembly component and to prevent radiation leakage outside of the apparatus. Depending on the component being shielded and its location within the installation, the shielding may comprise one or more of lead, steel, copper, and polyethylene. The apparatus additionally comprises (v) an integrated target transfer assembly with a component for remote-controlled loading and conveying a plurality of target holders, each of the target holders loaded with a plurality of $^{100}$Mo targets, to a target drive component. An individual loaded target holder is transferrable from the loading/conveying component by remote control into a target drive component contained within the water-cooled target assembly component. The target holder is conveyed with the target drive component to a position which intercepts the bremsstrahlung photon radiation. The base of the target drive component is engaged with a target aligning centering component which precisely positions and aligns the loaded target holder for maximum interception of the bremsstrahlung photon radiation. The integrated target transfer assembly is additionally configured for remote controlled removal of an irradiated target holder from the target drive component and transfer to a lead-shielded hot cell for separation and recovery of $^{99m}$Tc decaying from $^{99}$Mo associated with the irradiated $^{100}$Mo targets. Alternatively, the irradiated $^{100}$Mo targets may be transferred into a lead-shielded shipping container for transfer to a hot cell off site.

It is apparent that the maximum achievable $^{99}$Mo yield is dependent on the amount of energy which can be safely deposited in the $^{100}$Mo targets, and also on the probability of giant dipole resonance photons interacting with the target nuclei. The amount of energy which can be safely deposited in the $^{100}$Mo targets depends on the heat capacity of the target assembly. If it is possible to quickly transfer large amounts of heat from the $^{100}$Mo targets, then it should be possible to deposit more energy into the $^{100}$Mo targets before they melt. Water is a desired coolant as it facilitates large heat dissipation and is also economical. Unfortunately, as the electron beam passes through cooling water within the bremsstrahlung converter component, the energy associated with the electron beam causes the water to undergo radiolysis. The radiolysis of water produces, among other things, gaseous hydrogen which creates an explosion hazard and also hydrogen peroxide which is corrosive to molybdenum and therefore, can greatly decrease the potentially achievable yields of $^{99}$Mo from the $^{100}$Mo targets. The energy associated with the bremsstrahlung photons passing through the cooling water in the water-cooled target assembly component housing the $^{100}$Mo targets also causes production of hydrogen peroxide from the water but much lower amounts of gaseous hydrogen.

Accordingly, another embodiment of the present disclosure is that separate cooling water systems are required for the water-cooled energy converter and for the water-cooled target assembly component to enable separate heat load dissipation from the two components, to maximize $^{99}$Mo production from the $^{100}$Mo targets.

It is within the scope of the present disclosure to incorporate into a first cooling water system for the water-cooled target assembly component, one or more of buffers for ameliorating the corrosive effects of hydrogen peroxide on molybdenum, sacrificial metals, and supplemental gaseous coolant circulation. Suitable buffers are exemplified by lithium hydroxide, ammonium hydroxide and the like. Suitable sacrificial metals are exemplified by copper, titanium, stainless steel, and the like.

It is within the scope of the present disclosure to incorporate into a second cooling water system for the bremsstrahlung converter component an apparatus or equipment or a device for combining the gaseous hydrogen with oxygen to form water within the recirculating water. It is optional to use gaseous coolants for cooling the bremsstrahlung converter component or alternatively, to supplement the water cooling of the bremsstrahlung converter component.

An exemplary high-power linac electron beam apparatus 10 for producing $^{99}$Mo from a plurality of $^{100}$Mo targets is shown in FIGS. 1-5 and comprises a 35 MeV, 40 kW electron linac 20 manufactured by Mevex Corp. (Ottawa, ON, CA), a collimator station 25 to narrow the beam of electrons generated by the linac 20, and a target assembly station 30 comprising a target radiation chamber 42 (FIGS. 6-11), a cooling tower assembly 32, a cooling liquid supply 34, and vacuum apparatus 36 connected to the target radiation chamber 42 by vacuum pipe 37. The components 20, 25, 30 comprising the linac electron beam apparatus 10 are shielded with protective cladding 15 to contain and confine gamma radiation and/or neutron radiation. The 35 MeV, 40 kW electron linac 20 comprises three 1.2 m S-band on-axis coupled standing-wave sections, three modulators plus high-duty factor klystrons having 5 MW peaks, and a 60-kV thermionic gun. The linac 20 is mounted on a support framework 22 provided with rollers 23 to enable disengagement of the linac 20 from the collimator station 25 for access to and maintenance of the converter station 25 components. The collimator station 25 comprises a water-cooled tapered copper tube with a beryllium window for narrowing the electron beam generated by the linac 20 to a diameter of about 0.075 cm to about 0.40 cm, about 0.10 cm to about 0.35 cm, about 0.15 cm to about 0.30 cm, about 0.20 to about 0.25 cm.

Figure 7:
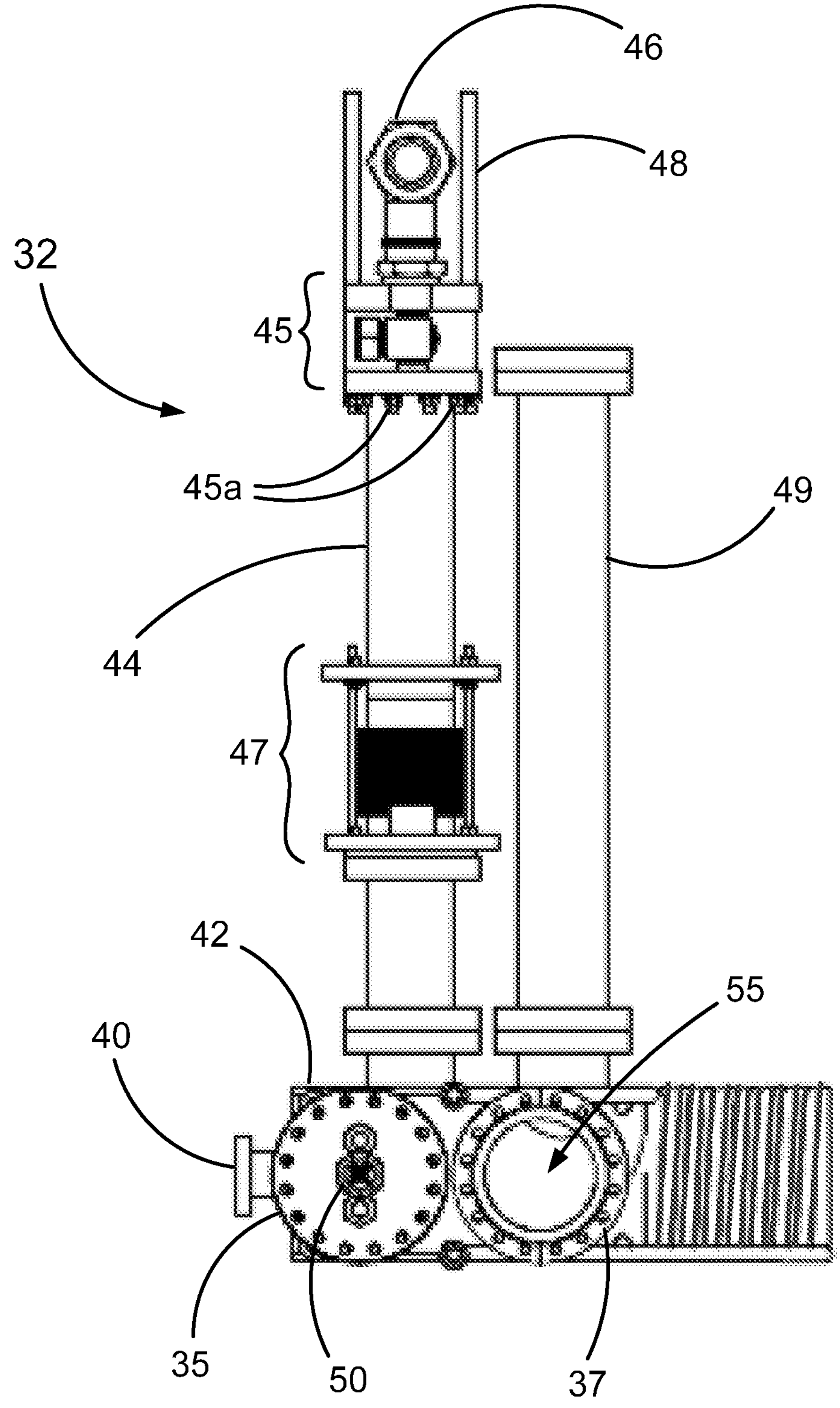
FIG. 7 is a side view of the target drive assembly (perpendicular to the electron beam generated by the linear accelerator)
Figure 8:
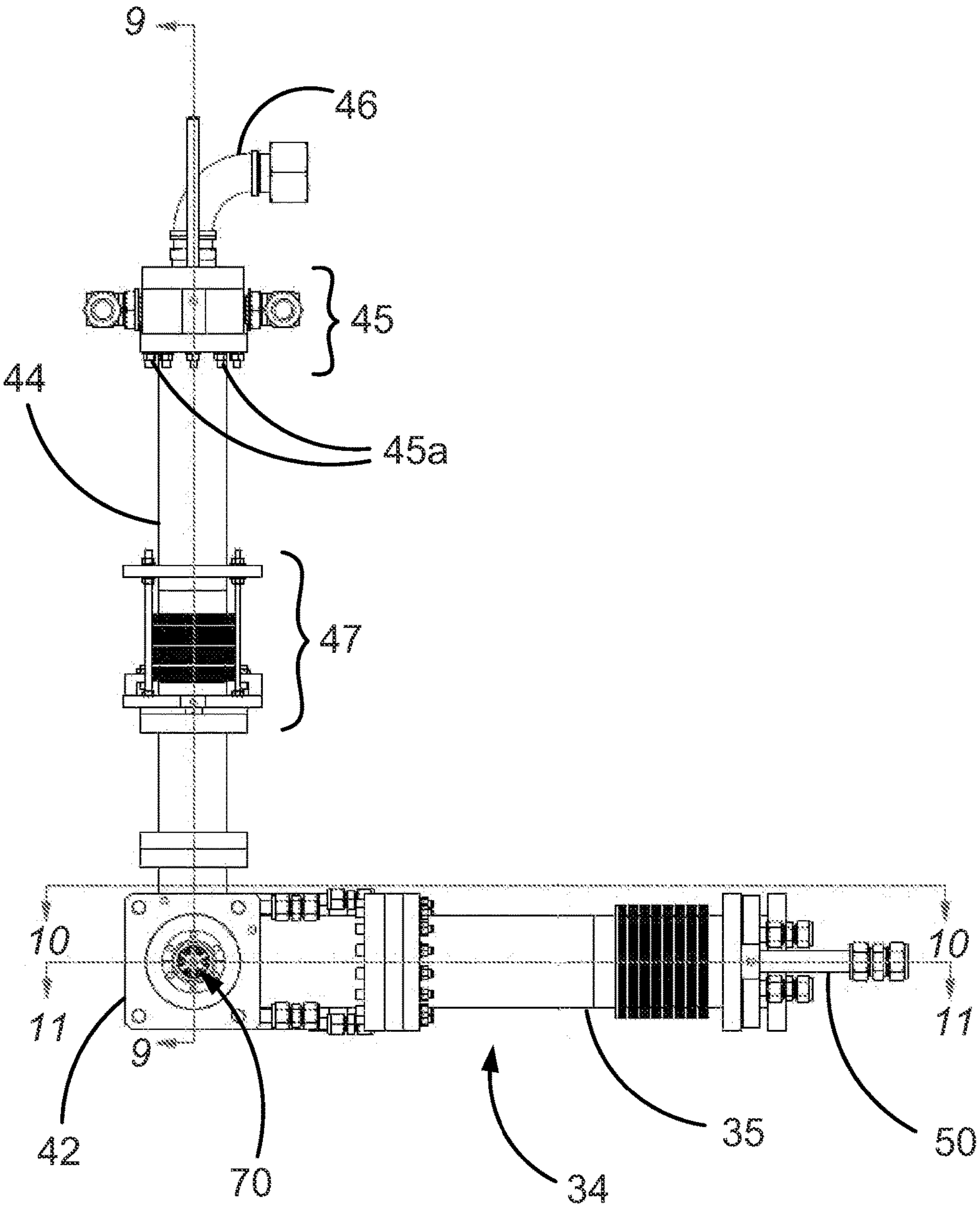
FIG. 8 is a front view of the target drive assembly showing the inlet for the bremsstrahlung photon beam generated from the linac electron beam.
Figure 9:
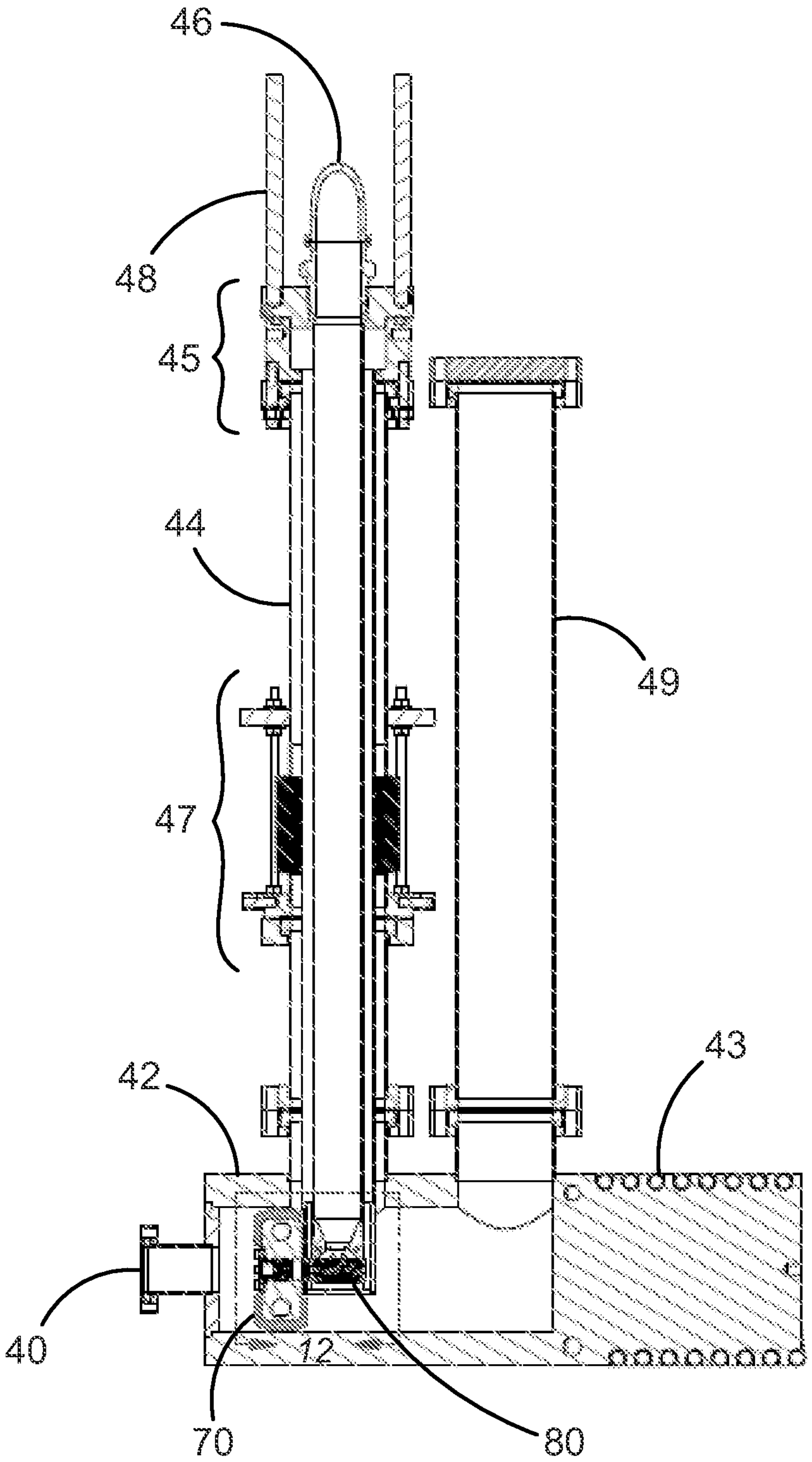
FIG. 9 is a cross-sectional front view of the target drive assembly shown in FIG. 8.

The target assembly station 30 comprises a support plate 39 for a support member 38 onto which is mounted the target radiation chamber 42 with an inlet pipe 40 for sealingly engaging the electron beam delivery pipe 28 (FIGS. 6(A) and 6(B)). A cooling tower component 32 is sealingly engaged with the target radiation chamber 42 directly above the radiation chamber wherein a target holder is mounted during the radiation process. A vacuum pipe 37 and a converter station cooling assembly 34 are sealingly mounted to the side of the target radiation chamber 40 (FIGS. 6(A) and 6(B)). The cooling tower component 32 comprises a coolant tube housing 44 that is sealingly engaged at its distal end to a coolant tube cap assembly 45 with a plurality of nuts 45*a*. The coolant tube cap assembly is provided in this example with rods 48 for remote-controlled engagement by a crane (not shown) for lifting and separating the cooling tower component 32 from the target radiation chamber 42 (FIGS. 7-9). A coolant water supply tube 100 (FIGS. 16(A)-16(C) is housed within the coolant tube housing 44 and receives a supply of cooling water from water inlet ingress pipe 46 which is sealingly engaged with the coolant tube cap assembly 45.

Figure 16:
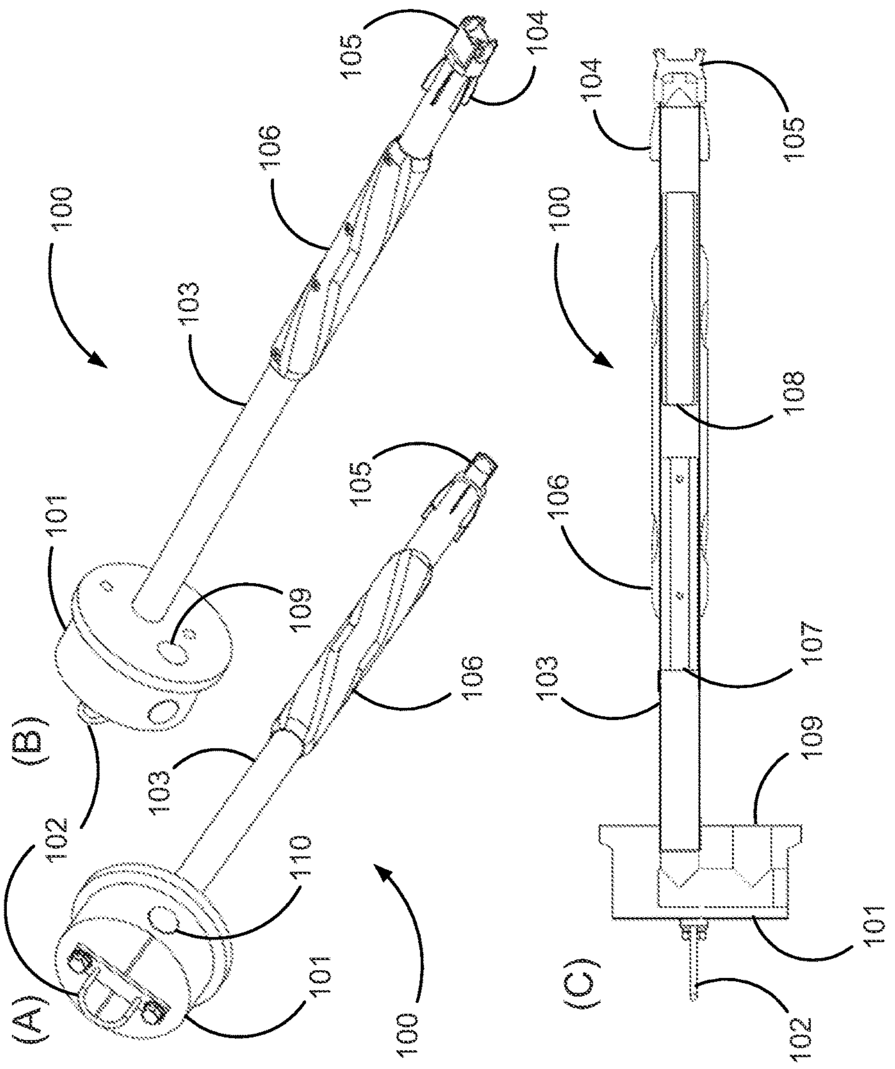
FIG. 16(A) is a perspective view from the top of an exemplary cooling tube component, while 16(B) is a perspective view from the bottom of the cooling tube component, and 16(C) is a cross-sectional side view of the cooling tube component.

The cooling water supply tube 100 (FIGS. 16(A)-16(C)) comprises an upper hub assembly 101 at its proximal end, a coolant supply tube 103, a plurality of guide fines 104 at its proximal end, and a cooling tube body holder 105 for releasably engaging a target holder 80. The upper hub assembly 101 is provided with a hook 102 for remote-controlled installation by an overhead crane (not shown) of the cooling water supply tube 100 into and removal from a coolant tube housing 44. An outer shield 106 is provided about the coolant supply tube 103 to position the coolant supply tube 103 within the coolant tube housing 44 and to provide shielding against the bremsstrahlung photon shower that may ingress into the coolant tube housing 44. The outer surface of the outer shield 106 is provided with channels to allow the flow of cooling water therethrough. The coolant supply tube 103 is provided with an inner upper shield 107 and an inner lower shield 108 to provide shielding against the bremsstrahlung photon shower that may ingress into the coolant supply tube 103. Cooling water is delivered by water inlet ingress pipe 46 into the proximal end of coolant supply tube 103 through an ingress port (not shown) in the upper hub assembly 101 and is delivered out of the distal end coolant supply tube 103 through cooling tube body holder 105 and then circulates back to the upper hub assembly 101 in the space between the outside of coolant supply tube 103 and the inside of coolant tube housing 44 and then egresses the cooling water supply tube 100 through ports 109, 110 provided in the upper hub assembly 10. The coolant supply tube 103 is provided with a plurality of fins 104 about its outer diameter approximate the cooling tube body holder 105 and function as a guide for remote-controlled installation of the cooling water supply tube 100 into and removal from a coolant tube housing 44, by an overhead crane (not shown). The coolant tube housing 44 is provided with a coolant tube alignment assembly 47 to enable precise alignment of the cooling water supply tube 100 within the coolant tube housing 44. The coolant water supply delivered to and circulated through the target radiation chamber 42 by the cooling tower component 32 comprises a first cooling water system.

Figure 10:
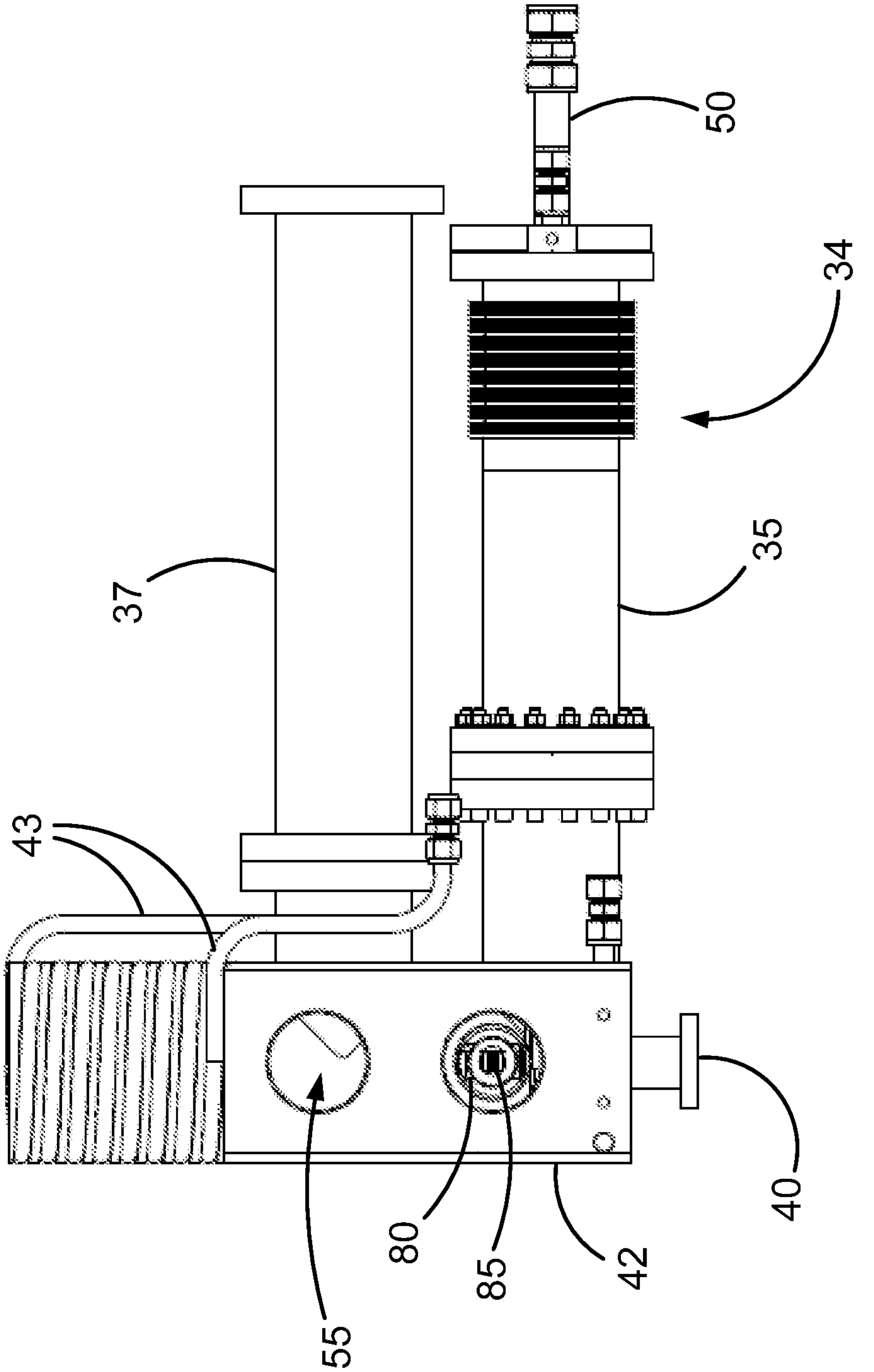
FIG. 10 is a cross-sectional top view of the target drive assembly shown in FIG. 8 at the junction of the cooling tower component and the housing for the beamline.
Figure 11:
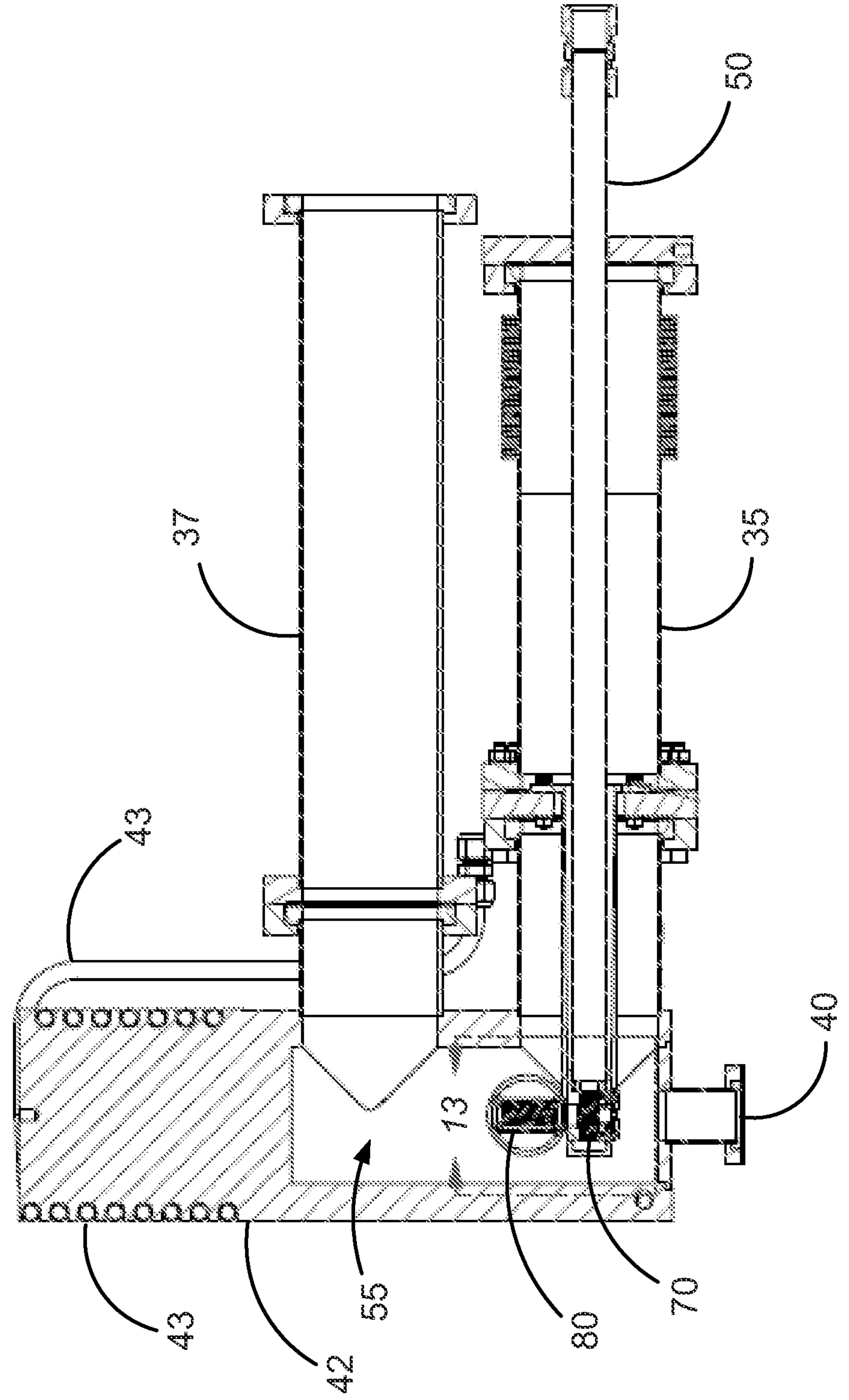
FIG. 11 is a cross-sectional top view of the target drive assembly shown in FIG. 8 showing the target holder mounted in the beamline.

The target radiation chamber 42 has an inner chamber 55 wherein is mounted a bremsstrahlung converter station 70 adjacent to the electron beam inlet pipe 40 (FIGS. 10, 11). The bremsstrahlung converter station 70 is accessible through the converter station cooling assembly 34 that is sealingly engaged with the side of the target radiation chamber 42. The converter station cooling assembly 34 comprises a cooling water pipe 50 for circulation of a second cooling water supply to, about, and from the bremsstrahlung converter station 70. The cooling water pipe 50 is housed within a housing 35. Also integrally engaged with the side of the target radiation chamber 42 and communicating with the inner chamber 55 is a vacuum pipe 37 interconnected with a vacuum apparatus 36. After the high-power linac electron beam apparatus 10 has been assembled, the integrity of the beryllium window and its seal in the collimator station 25 and the integrity of a silicon window (alternatively, a diamond window) interposed the inlet pipe 40 and the bremsstrahlung converter station 70 are assessed by application of a vacuum to chamber 55 by the vacuum apparatus 36 via vacuum pipe 37.

Figure 12:
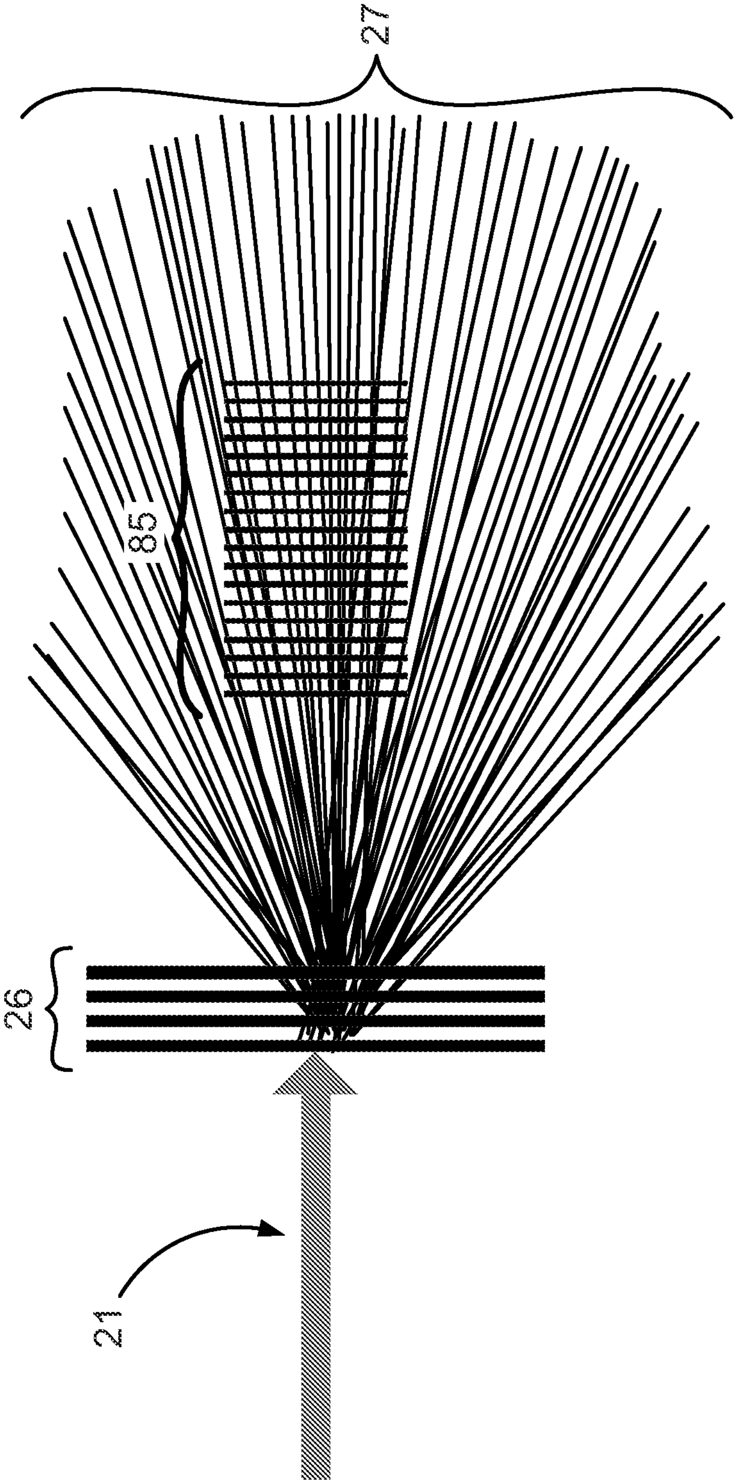
FIG. 12 is schematic illustration of the conversion of a high-power electron beam into a bremsstrahlung photon shower for irradiation of a plurality of $^{100}$Mo targets.
Figure 13:
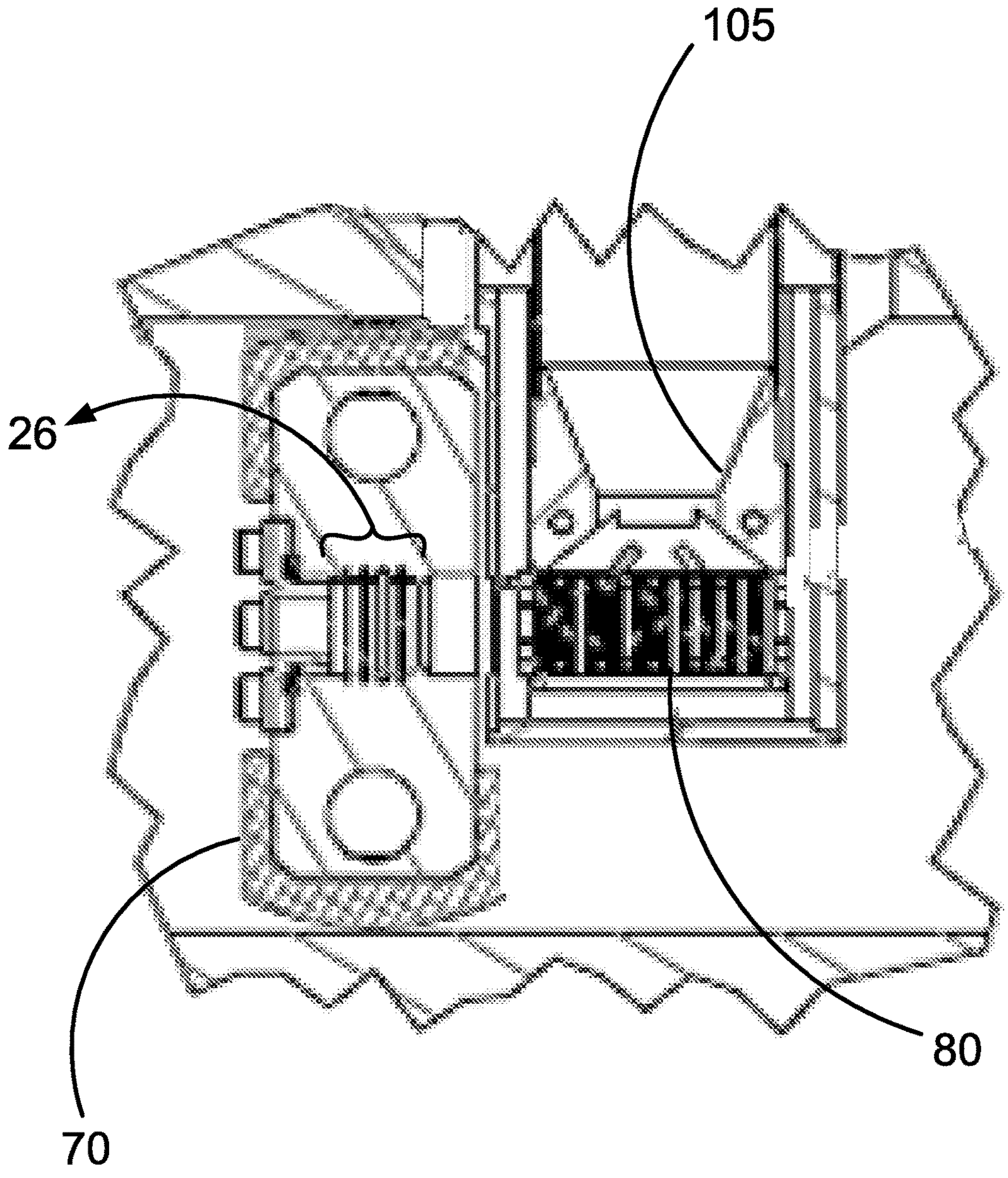
FIG. 13 is close-up cross-sectional front view from FIG. 9 showing the mounted target holder.
Figure 14:
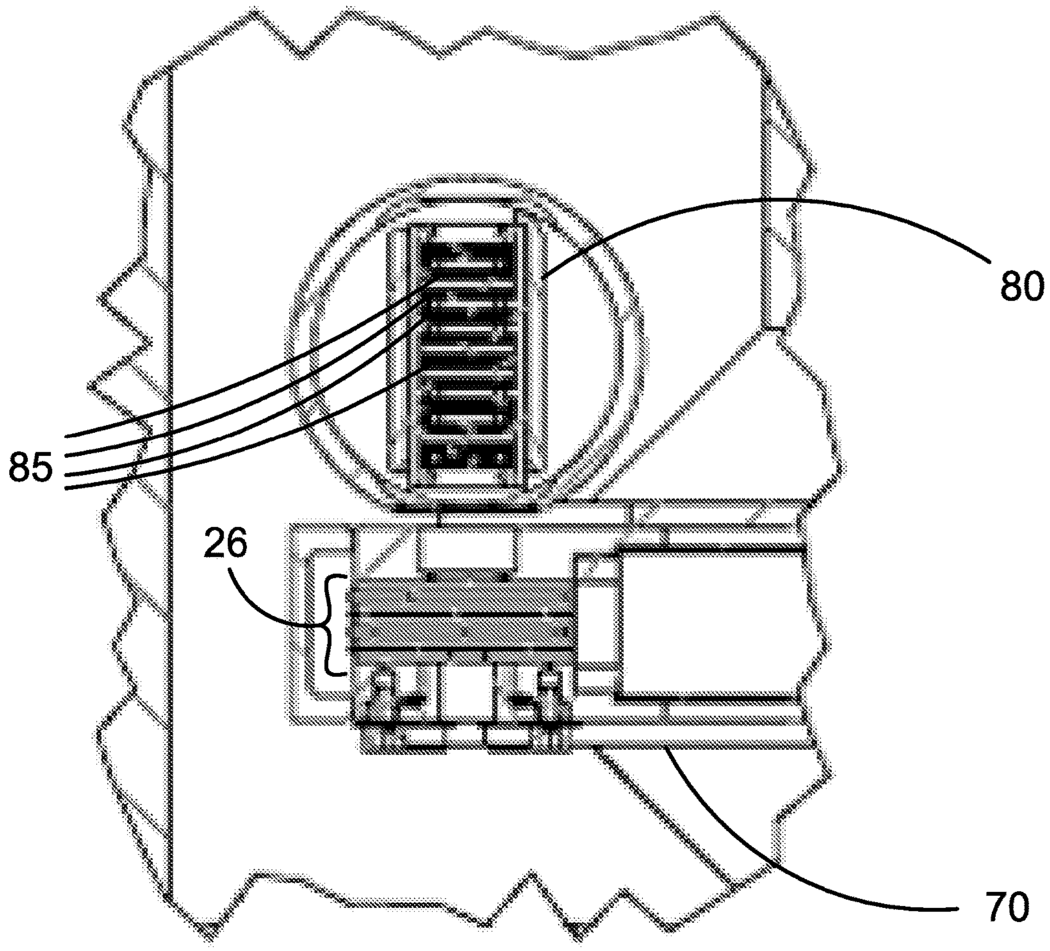
FIG. 14 is a close-up cross-sectional top view from FIG. 11 showing the mounted target holder.

The bremsstrahlung converter station 70 comprises a series of four thin tantalum plates 26 (FIG. 12) placed at a 90° angle to the electron beam 21 (FIG. 12) generated by the linac 20. However, it is to be noted that number and/or thickness of the tantalum plates can be changed in order to optimize and maximize photon production generated by the electron beam. It is optional to use plates comprising an alternative high-density metal exemplified by tungsten and tungsten alloys comprising copper or silver. The tantalum plates 26, when bombarded by the high-energy electron beam, convert incident electrons into a bremsstrahlung photon shower 27 (FIG. 12) which is delivered directly to a target holder 80 housing a plurality of $^{100}$Mo target discs 85 (FIGS. 13, 14). It should be noted that converter may be provided with more than four tantalum plates, or alternatively with less than tantalum four plates. For example, one tantalum plate, two tantalum plates, three tantalum plates, five tantalum plates or more. Alternatively, the plates may comprise tungsten or copper or cobalt or iron or nickel or palladium or rhodium or silver or zinc and/or their alloys. The structure and configuration of the converter station 70 is designed to and to dissipate the large heat load carried by the high-energy electron beam to minimize its transfer to the photon shower to reduce the heat-load transferred to the $^{100}$Mo targets during radiation. Furthermore, the tantalum plates 26 and the target holder 80 housing a plurality of $^{100}$Mo target discs 85 are cooled during the irradiation process by constant circulation of: (i) coolant water through the $^{100}$Mo target discs 85 by first cooling water system, and (ii) coolant water through the tantalum plates 26 by the second cooling water system.

Figure 15:
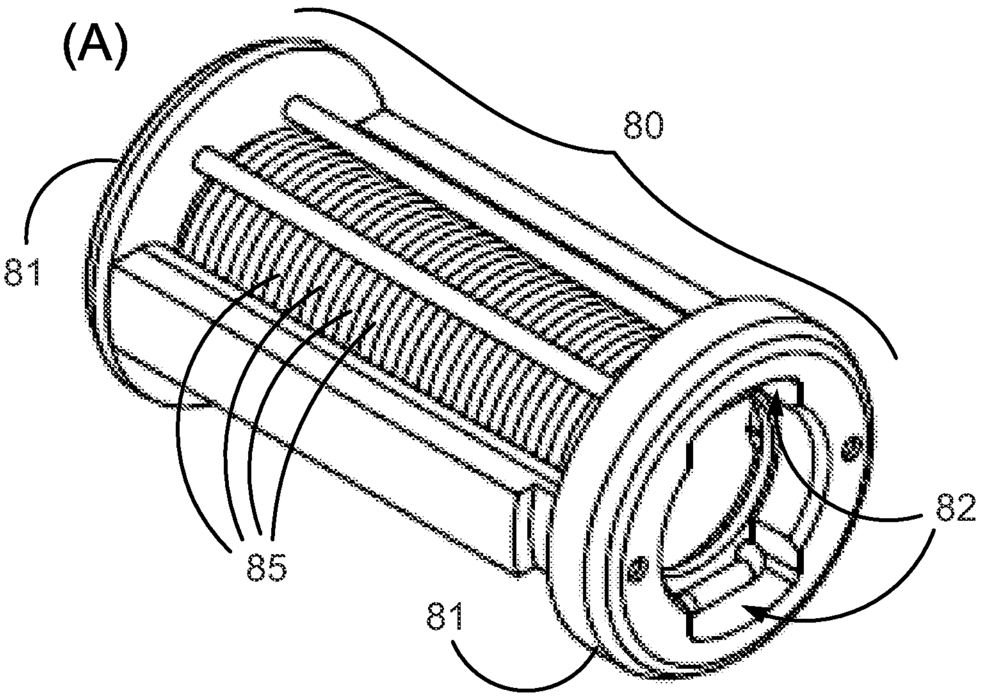
FIG. 15(A) is a perspective view of an exemplary target holder, while 15(B) is a cross-sectional side view of the target holder.
Figure 15:
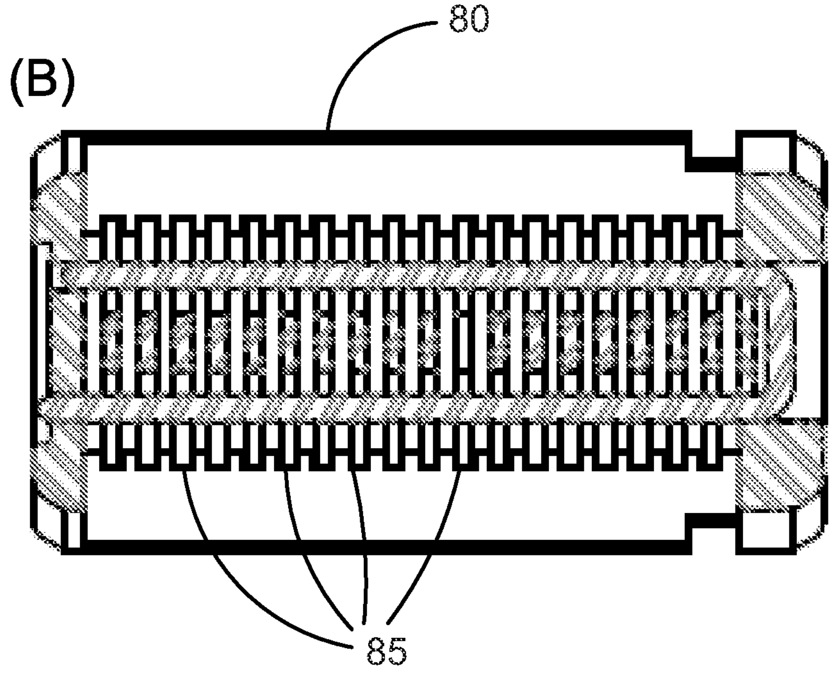

Another embodiment of the present disclosure pertains to target holders for receiving and housing therein a plurality of $^{100}$Mo target discs. An exemplary target holder 80 housing a series of eighteen $^{100}$Mo target discs 85 is shown in FIGS. 15(A) and 15(B). The ends of the target holder 80 are provided with slots for engagement by the cooling tube body holder 105 at the distal end of the coolant water supply tube 103. It is to be noted that suitable target holders for irradiation of $^{100}$Mo targets with the exemplary high-power linac electron beam apparatus 10 of the present disclosure may house in series any number of $^{100}$Mo target discs from a range of about 4 to about 30, about 8 to about 25, about 12 to about 20, about 16 to about 18. Suitable $^{100}$Mo target discs can prepared by pressing-commercial-grade Mo powders or pellets into discs and then sintering the formed discs. Alternatively, precipitated $^{100}$Mo powders and/or granules recovered from previously irradiated $^{100}$Mo targets may be pressed into discs and then sintered. It is optional, after $^{100}$Mo powders or pellets are formed into discs, to solidify the $^{100}$Mo materials by arc melting or electron beam melting or other such processes. Sintering should be done in an inert atmosphere at a temperature from a range of about 1200° C. to about 2000° C., about 1500° C. to about 2000° C., about 1300° C. to about 1900° C., about 1400° C. to about 1800° C., about 1400° C. to about 1700° C., for a period of time from the range of 2-7 h, 2-6 h, 4-5 h, 2-10 h in an oxygen-free atmosphere provided by an inert gas exemplified by argon. Alternatively, the sintering process may be done under vacuum. Suitable dimensions for the $^{100}$Mo target discs are about 8 mm to about 20 mm, about 10 mm to about 18 mm, about 12 mm to about 15 mm, with a density in a range of about 4.0 g/cm$^3$ to about 12.5 g/cm$^3$, 6.0 g/cm$^3$ to about 10.0 g/cm$^3$, about 8.2 g/cm$^3$. The end components 81 of the target holder 80 are provided with two or more slots 82 for engagement by the cooling tube body holder 105 of the cooling water supply tube 103.

FIG. 9 shows a vertical cross-sectional view of an exemplary target holder 80 housing a series of 18 $^{100}$Mo target discs securely engaged within the target radiation chamber 42 for irradiation with a bremsstrahlung photon flux generated by the bremsstrahlung converter station 70. FIGS. 13 and 14 are close-up views from the side and the top respectively, of the target holder 80 secured in place by the body holder component 105 of the cooling water supply tube 100 (FIGS. 16(A)-16(C)) and positioned for irradiation with a bremsstrahlung photon flux.

Figure 17:
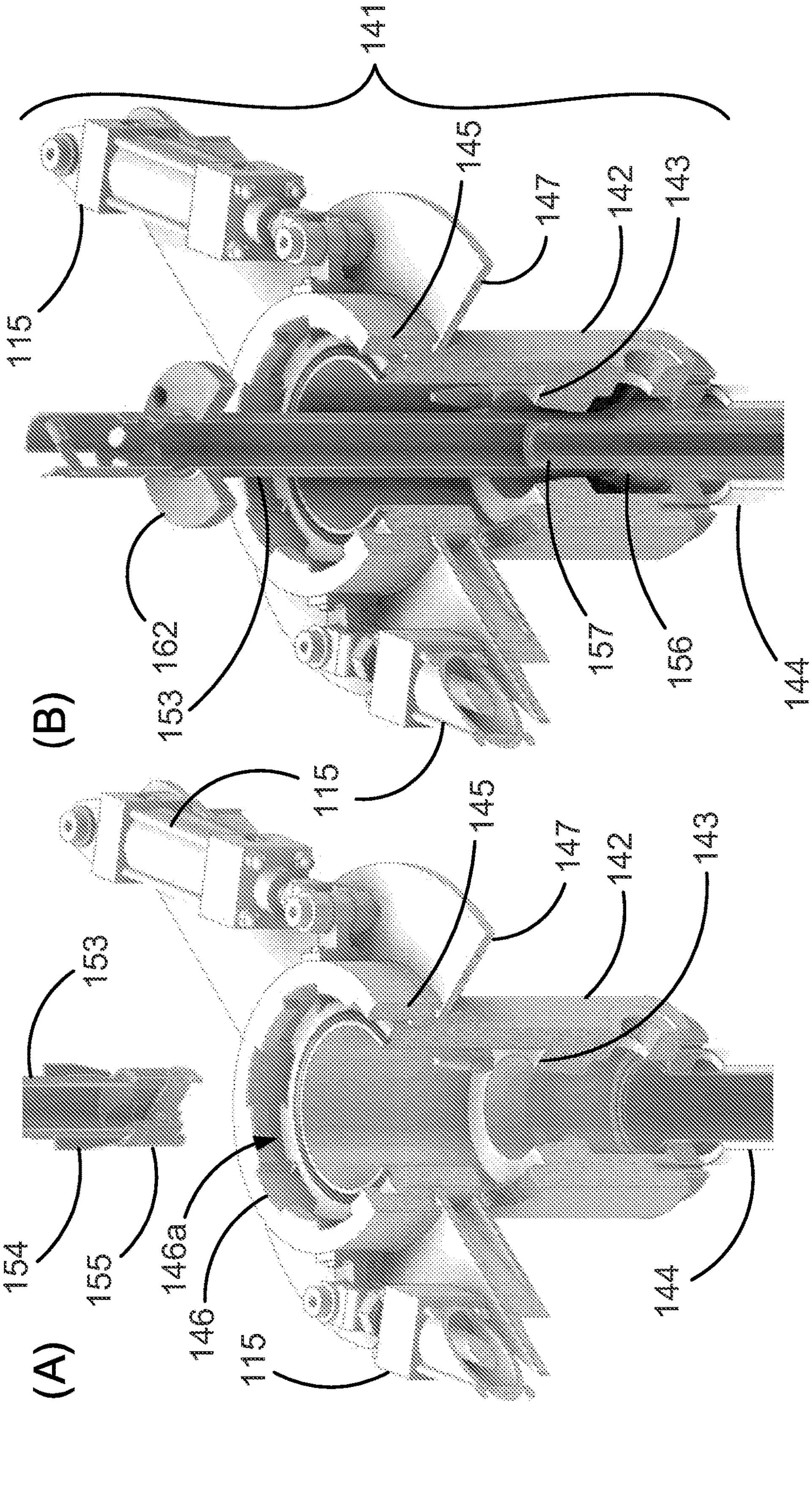
FIGS. 17(A) and 17(B) show another embodiment of a cooling tube component being installed into a target assembly component from FIG. 9.
Figure 18:
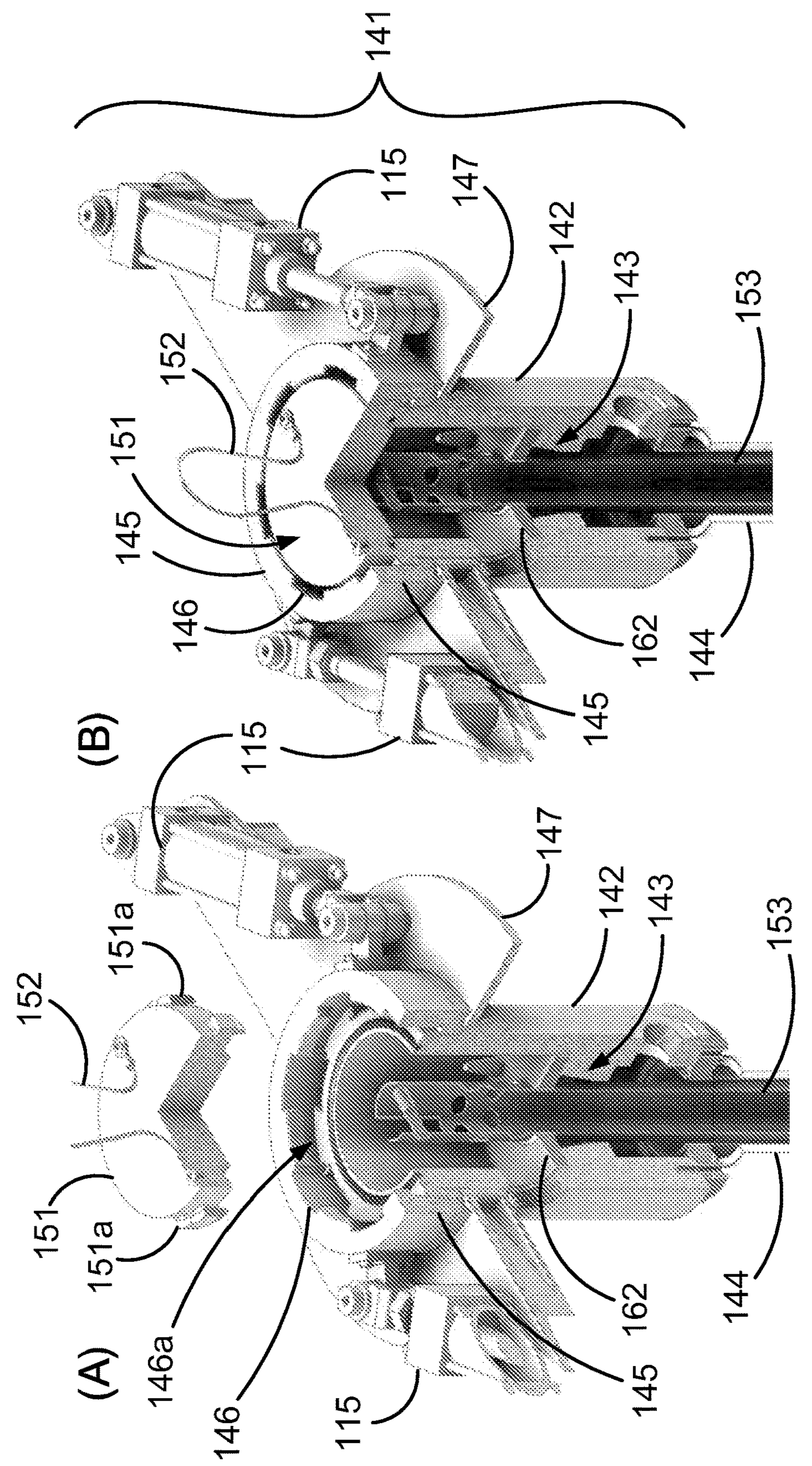
FIGS. 18(A) and 18(B) show the cooling tube component from FIG. 17 being clamped into place within the target assembly component.

FIGS. 17 and 18 show another exemplary embodiment of a cooling water supply tube 153 being installed into a coolant tube housing 144. The cooling water supply tube 153 has a plurality of cooling tube guide fins 154 about its proximal end, a cooling tube body holder 155 at its distal end (FIG. 17(A)), and a retaining ring 162 approximate its proximal end (FIG. 17(B)). The cooling water supply tube 153 has an outer shield 156, an inner upper shield 157 (FIG. 17(B)), and an inner lower shield (not shown). The upper end of the coolant tube housing is provided with a coolant tube cap assembly 141 comprising a coolant tube cap body 142 integrally engaged with the upper end of the coolant tube housing 144 (FIGS. 17 and 18). The coolant tube cap body 142 has an integral shoulder portion 143 for seating thereon the coolant tube retaining ring 162 (FIGS. 18(A) and 18(B)). The coolant tube cap assembly 141 also comprises a flange 147 interposed the coolant tube cap body 142 and a collar 145 integrally engaged with the top of the coolant tube cap body 142. The coolant tube cap collar 145 has a plurality of vertical channels 146 provided around its inner diameter, with each vertical channel 146 having a contiguous horizontal side channel **146*a* (FIG. 17(A)). Also provided is a coolant tube cap 151 for sealing engaging the coolant tube cap collar 145 after a cooling water supply tube 153 is installed into the coolant tube housing 144 (FIGS. 18(A), 18(B)). The coolant tube cap 151 has a plurality of outward-facing lugs 151*a* spaced around its side wall for slidingly engaging the vertical channels 146 and horizontal side channels 146*a* of the coolant tube cap collar 145. A coolant tube cap lifting loop 152 is secured to the top of the coolant tube cap 151** for releasable engagement by a remote-controlled overhead crane (not shown).

Operation of the high-power linac electron beam apparatus 10 of the present disclosure generally comprises the steps of loading a plurality of sintered $^{100}$Mo target discs 85 into a target holder 80, for example with eighteen $^{100}$Mo target discs, moving the loaded target holder 80 by remote control into and through the coolant tube housing 44 into the target radiation chamber 42. The coolant tube housing 44 is then lowered onto the target radiation chamber 42 by a remote-controlled overhead crane, and sealingly engaged to the target radiation chamber 42. A coolant supply tube 103 is then lowered into the coolant tube housing 44 until the cooling tube body holder 105 engages the target holder. The target holder 80 is then precisely positioned and aligned by remote-controlled manipulation of the coolant supply tube 103 for maximum irradiation with a photon flux produced by the bremsstrahlung converter station 70. The upper hub assembly of the cooling water supply tube 101 is then sealed into the coolant tube housing 44 by mounting of the coolant tube cap assembly 45 and a first pressurized supply of coolant water is then sealing attached to the water inlet pipe 46 for circulation through the target holder 80, the $^{100}$Mo target discs 85, and the radiation chamber 55 of the target radiation chamber 42. A second pressurized supply of coolant water is then sealingly attached to the coolant water supply pipe 50 for separately circulating coolant water through the bremsstrahlung converter station 70.

The linac 20 is then powered up to produce an electron beam for bombarding the tantalum plates 26 housed within the bremsstrahlung converter station 70 to produce a shower of bremsstrahlung photons for irradiating the target holder 80 loaded with the plurality of $^{100}$Mo target discs. It is suitable when using the high-power linac electron beam apparatus 10 disclosed herein comprising a 35 MeV, 40 kW electron linac 20 for irradiating a target holder housing a plurality of $^{100}$Mo target discs, to irradiate the target holder and discs for a period of time from a range of about 24 hrs to about 96 hrs, about 36 hrs to 72 hrs, about 24 hrs, about 36 hrs, about 48 hrs, about 60 hrs, about 72 hrs, about 80 hrs, about 96 hrs. After providing irradiation to the $^{100}$Mo target discs for a selected period of time, the linac 20 is powered down, the two supplies of coolant water are shut off, the target irradiation chamber 42 is drained of coolant water. The cooling water supply is disconnected from the water inlet pipe 46 after which the coolant tube cap assembly 45 is disengaged from the coolant tube housing 44 and removed by a remote-controlled overhead crane. The cooling water supply tube 100 is then removed from the coolant tube housing 44 by the remote-controlled overhead crane after which, the coolant tube housing 44 is disengaged from the target irradiation chamber 42 and removed. The target holder 80 housing the irradiated $^{100}$Mo target discs comprising $^{99}$Mo is then removed by remote-controlled overhead crane from the target irradiation chamber 42. At this point, it is optional to transfer the target holder 80 with the irradiated $^{100}$Mo target discs into a lead-lined container for shipping to a facility for recovery of $^{99m}$Tc therefrom. Alternatively, the target holder 80 with the irradiated $^{100}$Mo target discs can be transferred by remote control into a hot cell wherein $^{99m}$Tc may be separated and recovered from irradiated $^{100}$Mo target discs using equipment and methods known to those skilled in these arts. Suitable equipment for separating and recovering $^{99m}$Tc is exemplified by a TECHNEGEN® isotope separator (TECHNEGEN is a registered trademark of NorthStar Medical Radioisotopes LLC, Madison, Wis., USA). After recovery of the $^{99m}$Tc has been completed, the $^{100}$Mo is recovered, dried, and reformed into discs for sintering using methods known to those skilled in these arts.

The exemplary high-power linac electron beam apparatus disclosed herein for generating 40 kW, 35 MeV electron beam that is converted into a bremsstrahlung photon shower for irradiating a plurality of $^{100}$Mo targets to produce $^{99}$Mo through a photo-nuclear reaction on the $^{100}$Mo targets, has the capacity to produce on a 24-hr daily basis about 50 curies (Ci) to about 220 Ci, about 60 Ci to about 160 Ci, about 70 Ci to about 125 Ci, about 80Ci to about 100 Ci of $^{99}$Mo from a plurality of irradiated $^{100}$Mo target discs weighing in aggregate about 12 g to about 20 g, about 14 g to about 18 g, about 15 g to about 17 g. Allowing 48 hrs for dissolution of $^{99}$Mo from the plurality of irradiated $^{100}$Mo target discs will result in a daily production of about 35 Ci to about 65 Ci, about 40 Ci to about 60 Ci, about 45 Ci to about 55 Ci of $^{99}$Mo for shipping to nuclear pharmacies.

It should be noted that while the exemplary high-power linac electron beam apparatus disclosed herein pertains to a 35 MeV, 40 kW electron linac for producing $^{99}$Mo from a plurality of $^{100}$Mo targets, the apparatus can be scaled-up to about 100 kW of electron-beam power, or alternatively, scaled-down to about 5 kW of electron-beam power.

The invention claimed is:

1. An apparatus for producing molybdenum-99 ($^{99}$Mo) from a plurality of molybdenum-100 ($^{100}$Mo) targets through a photo-nuclear reaction on the $^{100}$Mo targets, the apparatus comprising:
- a linear accelerator component capable of producing an electron beam;
- a converter component capable of receiving the electron beam and producing therefrom a shower of bremsstrahlung photons;
- a target irradiation component for receiving the shower of bremsstrahlung photons, the target irradiation component having a chamber for receiving, demountingly engaging, and positioning therein a target holder housing a plurality of $^{100}$Mo target discs;
- a target holder transfer and recovery component for receiving, manipulating and conveying the target holder therein by remote control, said target holder transfer and recovery component engaged with and communicable with the target irradiation component; and
- a cooling system sealingly engaged with the converter component for circulation of a coolant fluid therethrough.

2. The apparatus according to claim 1, wherein the linear accelerator component has at least 10 kW of power to about 100 kW of power.

3. The apparatus according to claim 1, wherein the converter component comprises at least one metal plate positioned to intercept the electron beam produced by the linear accelerator component.

4. The apparatus according to claim 3, wherein the metal plate comprises a copper plate, a cobalt plate, an iron plate, a nickel plate, a palladium plate, a rhodium plate, a silver plate, a tantalum plate, a tungsten plate, a zinc plate, or an alloy of any of the foregoing metals.

5. A system for producing molybdenum-99 ($^{99}$Mo) from a plurality of molybdenum-100 ($^{100}$Mo) targets through a photo-nuclear reaction on the $^{100}$Mo targets, the system comprising:
- the apparatus of claim 1;
- at least one target holder for receiving and housing therein a plurality of $^{100}$Mo target discs;
- a supply of $^{100}$Mo target discs for installation into the target housing; and
- a remote-controlled equipment for remote-controlled installation of the target holder housing therein a plurality of $^{100}$Mo target discs, into the apparatus for irradiation with a photon flux generated within the apparatus and for remote-controlled recovery of the target holder from the apparatus after a period of irradiation with the photon flux.

6. A system according to claim 5, additionally comprising an equipment for remote-controlled dispensing of the target holder housing the photon-irradiated $^{100}$Mo target discs into a lead-lined shipping container.

7. A system according to claim 5, additionally comprising a hot cell for receiving therein the target holder housing the photon-irradiated $^{100}$Mo target discs and for processing therein said photon-irradiated $^{100}$Mo target discs to separate and recover therefrom 99m-technetium ($^{99m}$Tc).

8. The apparatus according to claim 1, comprising a cooling tube assembly demountably engageable with the target holder, the cooling tube assembly configured for circulating a second coolant through the $^{100}$Mo target discs.

9. The apparatus according to claim 8, wherein the cooling tube assembly comprises a coolant supply tube having a plurality of guide fins and cooling tube shielding to provide shielding against the shower of bremsstrahlung photons.

10. The apparatus according to claim 1, wherein the target irradiation component comprises a target alignment component for positioning and aligning the target holder for maximum interception of the shower of bremsstrahlung photons.

11. The apparatus according to claim 1, wherein the shower of bremsstrahlung photons has an energy of at least 10 MeV to about 45 MeV.

* * * * *